(12) United States Patent
Bao et al.

(10) Patent No.: US 10,389,650 B2
(45) Date of Patent: Aug. 20, 2019

(54) BUILDING AND MAINTAINING A NETWORK

(71) Applicant: Aerohive Networks, Inc., Milpitas, CA (US)

(72) Inventors: Dalun Bao, San Jose, CA (US); Changming Liu, Cupertino, CA (US)

(73) Assignee: Aerohive Networks, Inc., Milpitas, CA (US)

( * ) Notice: Subject to any disclaimer, the term of this patent is extended or adjusted under 35 U.S.C. 154(b) by 276 days.

(21) Appl. No.: 14/158,661

(22) Filed: Jan. 17, 2014

(65) Prior Publication Data

US 2014/0280967 A1    Sep. 18, 2014

Related U.S. Application Data

(60) Provisional application No. 61/788,621, filed on Mar. 15, 2013.

(51) Int. Cl.
*H04L 12/58* (2006.01)
*G06F 12/14* (2006.01)
*H04L 12/911* (2013.01)

(52) U.S. Cl.
CPC .............. *H04L 47/72* (2013.01); *H04L 47/74* (2013.01)

(58) Field of Classification Search
CPC ....................................................... G06F 15/16
See application file for complete search history.

(56) References Cited

U.S. PATENT DOCUMENTS

| 5,471,671 A | 11/1995 | Wang et al. |
| 5,697,059 A | 12/1997 | Carney |
| 5,726,984 A | 3/1998 | Kubler et al. |
| 5,956,643 A | 9/1999 | Benveniste |
| 6,061,799 A | 5/2000 | Eldridge et al. |
| 6,112,092 A | 8/2000 | Benveniste |
| 6,154,655 A | 11/2000 | Borst et al. |

(Continued)

FOREIGN PATENT DOCUMENTS

| CN | 1642143 | 7/2005 |
| EP | 0940999 | 9/1999 |

(Continued)

OTHER PUBLICATIONS

Clausen, T., et al., "Optimized Link State Routing Protocol (OLSR)," Network Working Group, pp. 1-71, Oct. 2003.

(Continued)

*Primary Examiner* — Nicholas R Taylor
*Assistant Examiner* — Sanjoy Roy
(74) *Attorney, Agent, or Firm* — Ahmann Kloke LLP

(57) ABSTRACT

Techniques and systems for establishing and maintaining networks. The technique includes assigning a network device to an interregional redirector system and load balancer systems. The network device can be assigned based upon the regions or subregions of the network device. The technique includes the load balancer systems assigning the network device to network device management engines. The status of the network device management engines can be monitored to determine if one of the network device management engines has failed. In the event that a network device management engine has failed, the network device can be assigned to a different network device management engine.

18 Claims, 6 Drawing Sheets

(56) References Cited

U.S. PATENT DOCUMENTS

| | | |
|---|---|---|
| 6,201,792 B1 | 3/2001 | Lahat |
| 6,233,222 B1 | 5/2001 | Wallentin |
| 6,314,294 B1 | 11/2001 | Benveniste |
| 6,473,413 B1 | 10/2002 | Chiou et al. |
| 6,496,699 B2 | 12/2002 | Benveniste |
| 6,519,461 B1 | 2/2003 | Andersson et al. |
| 6,628,623 B1 | 9/2003 | Noy |
| 6,628,938 B1 | 9/2003 | Rachabathuni et al. |
| 6,636,498 B1 | 10/2003 | Leung |
| 6,775,549 B2 | 8/2004 | Benveniste |
| 6,865,393 B1 | 3/2005 | Baum et al. |
| 6,957,067 B1 | 10/2005 | Iyer et al. |
| 7,002,943 B2 | 2/2006 | Bhagwat et al. |
| 7,057,566 B2 | 6/2006 | Theobold |
| 7,085,224 B1 | 8/2006 | Oran |
| 7,085,241 B1 | 8/2006 | O'Neill et al. |
| 7,130,629 B1 | 10/2006 | Leung et al. |
| 7,154,874 B2 | 12/2006 | Bhagwat et al. |
| 7,164,667 B2 | 1/2007 | Rayment et al. |
| 7,174,170 B2 | 2/2007 | Steer et al. |
| 7,177,646 B2 | 2/2007 | O'Neill et al. |
| 7,181,530 B1 | 2/2007 | Halasz et al. |
| 7,224,697 B2 | 3/2007 | Banerjea et al. |
| 7,216,365 B2 | 5/2007 | Bhagwat et al. |
| 7,251,238 B2 | 7/2007 | Joshi et al. |
| 7,336,670 B1 | 2/2008 | Calhoun |
| 7,339,914 B2 | 3/2008 | Bhagwat et al. |
| 7,346,338 B1 | 3/2008 | Calhoun et al. |
| 7,366,894 B1 | 4/2008 | Kalimuthu et al. |
| 7,369,489 B1 | 5/2008 | Bhattacharya |
| 7,370,362 B2 | 5/2008 | Olson et al. |
| 7,440,434 B2 | 10/2008 | Chaskar et al. |
| 7,512,379 B2 | 3/2009 | Nguyen |
| 7,536,723 B1 | 5/2009 | Bhagwat et al. |
| 7,562,384 B1 | 7/2009 | Huang |
| 7,593,356 B1 | 9/2009 | Friday et al. |
| 7,656,822 B1 | 2/2010 | AbdelAziz et al. |
| 7,706,789 B2 | 4/2010 | Qi et al. |
| 7,716,370 B1 | 5/2010 | Devarapalli |
| 7,751,393 B2 | 7/2010 | Chaskar et al. |
| 7,768,952 B2 | 8/2010 | Lee |
| 7,793,104 B2 | 9/2010 | Zheng et al. |
| 7,804,808 B2 | 9/2010 | Bhagwat et al. |
| 7,843,907 B1 | 11/2010 | Abou-Emara et al. |
| 7,844,057 B2 | 11/2010 | Meier et al. |
| 7,856,209 B1 | 12/2010 | Rawat |
| 7,921,185 B2 | 4/2011 | Chawla et al. |
| 7,949,342 B2 | 5/2011 | Cuffaro et al. |
| 7,961,725 B2 | 6/2011 | Nagarajan et al. |
| 7,970,894 B1 | 6/2011 | Patwardhan |
| 8,000,308 B2 | 8/2011 | Dietrich et al. |
| 8,069,483 B1 | 11/2011 | Matlock |
| 8,219,688 B2 | 7/2012 | Wang |
| 8,249,606 B1 | 8/2012 | Neophytou et al. |
| 8,493,918 B2 | 7/2013 | Karaoguz et al. |
| 8,553,612 B2 | 10/2013 | Alexandre |
| 8,789,191 B2 | 7/2014 | Bhagwat et al. |
| 8,824,448 B1 * | 9/2014 | Narayana ......... H04W 24/02 370/329 |
| 8,948,046 B2 | 2/2015 | Kang et al. |
| 8,953,453 B1 | 2/2015 | Xiao |
| 9,003,527 B2 | 4/2015 | Bhagwat et al. |
| 2001/0006508 A1 | 7/2001 | Pankaj et al. |
| 2002/0012320 A1 | 1/2002 | Ogier et al. |
| 2002/0021689 A1 | 2/2002 | Robbins et al. |
| 2002/0041566 A1 | 4/2002 | Yang |
| 2002/0071422 A1 | 6/2002 | Amicangioli |
| 2002/0091813 A1 | 7/2002 | Lamberton et al. |
| 2002/0114303 A1 | 8/2002 | Crosbie |
| 2002/0116463 A1 | 8/2002 | Hart |
| 2002/0128984 A1 | 9/2002 | Mehta et al. |
| 2003/0005100 A1 | 1/2003 | Barnard et al. |
| 2003/0039212 A1 | 2/2003 | Lloyd et al. |
| 2003/0084104 A1 | 5/2003 | Salem |
| 2003/0087629 A1 | 5/2003 | Juitt |
| 2003/0104814 A1 | 6/2003 | Gwon et al. |
| 2003/0129988 A1 | 7/2003 | Lee et al. |
| 2003/0145091 A1 | 7/2003 | Peng et al. |
| 2003/0179742 A1 | 9/2003 | Ogier et al. |
| 2003/0198207 A1 | 10/2003 | Lee |
| 2004/0003285 A1 | 1/2004 | Whelan et al. |
| 2004/0006640 A1 | 1/2004 | Inderieden |
| 2004/0013118 A1 | 1/2004 | Borella |
| 2004/0022222 A1 | 2/2004 | Clisham |
| 2004/0054774 A1 | 3/2004 | Barber et al. |
| 2004/0064467 A1 | 4/2004 | Kola et al. |
| 2004/0077341 A1 | 4/2004 | Chandranmenon et al. |
| 2004/0103282 A1 | 5/2004 | Meier et al. |
| 2004/0109466 A1 | 6/2004 | Van Ackere et al. |
| 2004/0125781 A1 | 7/2004 | Walter |
| 2004/0162037 A1 | 8/2004 | Shpak |
| 2004/0185876 A1 * | 9/2004 | Groenendaal ......... H04W 12/12 455/456.5 |
| 2004/0192312 A1 | 9/2004 | Li et al. |
| 2004/0196977 A1 | 10/2004 | Johnson et al. |
| 2004/0236939 A1 | 11/2004 | Watanabe et al. |
| 2004/0255028 A1 | 12/2004 | Chu et al. |
| 2005/0053003 A1 | 3/2005 | Cain et al. |
| 2005/0074015 A1 | 4/2005 | Chari et al. |
| 2005/0085235 A1 | 4/2005 | Park |
| 2005/0099983 A1 | 5/2005 | Nakamura et al. |
| 2005/0122946 A1 | 6/2005 | Won |
| 2005/0154774 A1 | 7/2005 | Giaffreda et al. |
| 2005/0207417 A1 | 9/2005 | Ogawa et al. |
| 2005/0259682 A1 | 11/2005 | Yosef et al. |
| 2005/0262266 A1 | 11/2005 | Wiberg et al. |
| 2005/0265288 A1 | 12/2005 | Liu et al. |
| 2005/0266848 A1 | 12/2005 | Kim |
| 2006/0010250 A1 | 1/2006 | Eisl et al. |
| 2006/0013179 A1 | 1/2006 | Yamane |
| 2006/0026289 A1 | 2/2006 | Lyndersay et al. |
| 2006/0062250 A1 | 3/2006 | Payne, III |
| 2006/0107050 A1 | 5/2006 | Shih |
| 2006/0117018 A1 | 6/2006 | Christiansen et al. |
| 2006/0140123 A1 | 6/2006 | Conner et al. |
| 2006/0146748 A1 | 7/2006 | Ng et al. |
| 2006/0146846 A1 | 7/2006 | Yarvis et al. |
| 2006/0165015 A1 | 7/2006 | Melick et al. |
| 2006/0187949 A1 | 8/2006 | Seshan et al. |
| 2006/0221920 A1 | 10/2006 | Gopalakrishnan et al. |
| 2006/0233128 A1 | 10/2006 | Sood et al. |
| 2006/0234701 A1 | 10/2006 | Wang et al. |
| 2006/0245442 A1 | 11/2006 | Srikrishna et al. |
| 2006/0251256 A1 | 11/2006 | Asokan et al. |
| 2006/0268802 A1 | 11/2006 | Faccin |
| 2006/0294246 A1 | 12/2006 | Stieglitz et al. |
| 2007/0004394 A1 | 1/2007 | Chu et al. |
| 2007/0010231 A1 | 1/2007 | Du |
| 2007/0025274 A1 | 2/2007 | Rahman et al. |
| 2007/0025298 A1 | 2/2007 | Jung |
| 2007/0030826 A1 | 2/2007 | Zhang |
| 2007/0049323 A1 | 3/2007 | Wang et al. |
| 2007/0077937 A1 | 4/2007 | Ramakrishnan et al. |
| 2007/0078663 A1 | 4/2007 | Grace |
| 2007/0082656 A1 | 4/2007 | Stieglitz et al. |
| 2007/0087756 A1 | 4/2007 | Hoffberg |
| 2007/0091859 A1 | 4/2007 | Sethi et al. |
| 2007/0115847 A1 | 5/2007 | Strutt et al. |
| 2007/0116011 A1 | 5/2007 | Lim et al. |
| 2007/0121947 A1 | 5/2007 | Sood et al. |
| 2007/0133407 A1 | 6/2007 | Choi et al. |
| 2007/0140191 A1 | 6/2007 | Kojima |
| 2007/0150720 A1 | 6/2007 | Oh et al. |
| 2007/0153697 A1 | 7/2007 | Kwan |
| 2007/0153741 A1 | 7/2007 | Blanchette et al. |
| 2007/0156804 A1 | 7/2007 | Mo |
| 2007/0160017 A1 | 7/2007 | Meier et al. |
| 2007/0171885 A1 | 7/2007 | Bhagwat et al. |
| 2007/0192862 A1 | 8/2007 | Vermeulen et al. |
| 2007/0195761 A1 | 8/2007 | Tatar et al. |
| 2007/0206552 A1 | 9/2007 | Yaqub |
| 2007/0247303 A1 | 10/2007 | Payton |
| 2007/0248014 A1 | 10/2007 | Xie |
| 2007/0249324 A1 | 10/2007 | Jou et al. |

(56) References Cited

U.S. PATENT DOCUMENTS

| | | |
|---|---|---|
| 2007/0263532 A1 | 11/2007 | Mirtorabi et al. |
| 2007/0280481 A1 | 12/2007 | Eastlake et al. |
| 2007/0288997 A1 | 12/2007 | Meier et al. |
| 2008/0002642 A1 | 1/2008 | Borkar et al. |
| 2008/0022392 A1 | 1/2008 | Karpati et al. |
| 2008/0037552 A1 | 2/2008 | Dos Remedios et al. |
| 2008/0080369 A1 | 4/2008 | Sumioka |
| 2008/0080377 A1 | 4/2008 | Sasaki et al. |
| 2008/0090575 A1 | 4/2008 | Barak et al. |
| 2008/0095094 A1 | 4/2008 | Innami |
| 2008/0095163 A1 | 4/2008 | Chen et al. |
| 2008/0107027 A1 | 5/2008 | Allan et al. |
| 2008/0109879 A1 | 5/2008 | Bhagwat et al. |
| 2008/0130495 A1 | 6/2008 | Dos Remedios et al. |
| 2008/0146240 A1 | 6/2008 | Trudeau |
| 2008/0151751 A1 | 6/2008 | Ponnuswamy et al. |
| 2008/0159128 A1 | 7/2008 | Shaffer |
| 2008/0159135 A1 | 7/2008 | Caram |
| 2008/0170527 A1 | 7/2008 | Lundsgaard et al. |
| 2008/0186932 A1 | 8/2008 | Do et al. |
| 2008/0194271 A1 | 8/2008 | Bedekar et al. |
| 2008/0207215 A1 | 8/2008 | Chu et al. |
| 2008/0209186 A1 | 8/2008 | Boden |
| 2008/0212562 A1 | 9/2008 | Bedekar et al. |
| 2008/0219286 A1 | 9/2008 | Ji et al. |
| 2008/0225857 A1 | 9/2008 | Lange |
| 2008/0229095 A1 | 9/2008 | Kalimuthu et al. |
| 2008/0240128 A1 | 10/2008 | Elrod |
| 2008/0253370 A1 | 10/2008 | Cremin et al. |
| 2008/0273520 A1 | 11/2008 | Kim et al. |
| 2008/0279161 A1 | 11/2008 | Stirbu et al. |
| 2009/0019521 A1 | 1/2009 | Vasudevan |
| 2009/0028052 A1 | 1/2009 | Strater et al. |
| 2009/0040989 A1 | 2/2009 | da Costa et al. |
| 2009/0043901 A1 | 2/2009 | Mizikovsky et al. |
| 2009/0082025 A1 | 3/2009 | Song |
| 2009/0088152 A1 | 4/2009 | Orlassino |
| 2009/0097436 A1 | 4/2009 | Vasudevan et al. |
| 2009/0111468 A1 | 4/2009 | Burgess et al. |
| 2009/0113018 A1* | 4/2009 | Thomson ............ H04W 8/12 709/208 |
| 2009/0141692 A1 | 6/2009 | Kasslin et al. |
| 2009/0144740 A1 | 6/2009 | Gao |
| 2009/0168645 A1 | 7/2009 | Tester et al. |
| 2009/0172151 A1 | 7/2009 | Davis |
| 2009/0197597 A1 | 8/2009 | Kotecha |
| 2009/0207806 A1 | 8/2009 | Makela et al. |
| 2009/0239531 A1 | 9/2009 | Andreasen et al. |
| 2009/0240789 A1 | 9/2009 | Dandabany |
| 2009/0247170 A1 | 10/2009 | Balasubramanian et al. |
| 2009/0257380 A1 | 10/2009 | Meier |
| 2009/0303883 A1 | 12/2009 | Kucharczyk et al. |
| 2009/0310557 A1 | 12/2009 | Shinozaki |
| 2010/0020753 A1 | 1/2010 | Fulknier |
| 2010/0046368 A1 | 2/2010 | Kaempfer et al. |
| 2010/0057930 A1 | 3/2010 | DeHaan |
| 2010/0061234 A1 | 3/2010 | Pai et al. |
| 2010/0067379 A1 | 3/2010 | Zhao et al. |
| 2010/0112540 A1 | 5/2010 | Gross et al. |
| 2010/0115278 A1 | 5/2010 | Shen et al. |
| 2010/0115576 A1 | 5/2010 | Hale et al. |
| 2010/0132040 A1 | 5/2010 | Bhagwat et al. |
| 2010/0195585 A1 | 8/2010 | Horn |
| 2010/0208614 A1 | 8/2010 | Harmatos |
| 2010/0228843 A1 | 9/2010 | Ok et al. |
| 2010/0238871 A1 | 9/2010 | Tosic |
| 2010/0240313 A1 | 9/2010 | Kawai |
| 2010/0254316 A1 | 10/2010 | Sendrowicz |
| 2010/0260091 A1 | 10/2010 | Seok |
| 2010/0290397 A1* | 11/2010 | Narayana ............ H04W 28/08 370/328 |
| 2010/0304738 A1 | 12/2010 | Lim et al. |
| 2010/0311420 A1 | 12/2010 | Reza et al. |
| 2010/0322217 A1 | 12/2010 | Jin et al. |
| 2010/0325720 A1 | 12/2010 | Etchegoyen |
| 2011/0004913 A1 | 1/2011 | Nagarajan et al. |
| 2011/0040867 A1 | 2/2011 | Kalbag |
| 2011/0051677 A1 | 3/2011 | Jetcheva et al. |
| 2011/0055326 A1 | 3/2011 | Michaelis et al. |
| 2011/0055928 A1 | 3/2011 | Brindza |
| 2011/0058524 A1 | 3/2011 | Hart et al. |
| 2011/0064065 A1 | 3/2011 | Nakajima et al. |
| 2011/0085464 A1 | 4/2011 | Nordmark et al. |
| 2011/0182225 A1 | 7/2011 | Song et al. |
| 2011/0185231 A1 | 7/2011 | Balestrieri et al. |
| 2011/0222484 A1 | 9/2011 | Pedersen |
| 2011/0258641 A1 | 10/2011 | Armstrong et al. |
| 2011/0292897 A1 | 12/2011 | Wu et al. |
| 2012/0014386 A1 | 1/2012 | Xiong et al. |
| 2012/0290650 A1 | 11/2012 | Montuno et al. |
| 2012/0322435 A1 | 12/2012 | Erceg |
| 2013/0003729 A1 | 1/2013 | Raman et al. |
| 2013/0003739 A1 | 1/2013 | Raman et al. |
| 2013/0003747 A1 | 1/2013 | Raman et al. |
| 2013/0028158 A1 | 1/2013 | Lee et al. |
| 2013/0059570 A1 | 3/2013 | Hara et al. |
| 2013/0086403 A1 | 4/2013 | Jenne et al. |
| 2013/0103833 A1 | 4/2013 | Ringland et al. |
| 2013/0188539 A1 | 7/2013 | Han |
| 2013/0227306 A1 | 8/2013 | Santos et al. |
| 2013/0227645 A1 | 8/2013 | Lim |
| 2013/0230020 A1 | 9/2013 | Backes |
| 2013/0250811 A1 | 9/2013 | Vasseur et al. |
| 2014/0269327 A1 | 9/2014 | Fulknier et al. |
| 2014/0298467 A1 | 10/2014 | Bhagwat et al. |
| 2015/0120864 A1 | 4/2015 | Unnimadhavan et al. |

FOREIGN PATENT DOCUMENTS

| | | |
|---|---|---|
| EP | 1732276 | 12/2006 |
| EP | 1771026 | 4/2007 |
| EP | 1490773 | 1/2013 |
| WO | 0059251 | 10/2000 |
| WO | 0179992 | 10/2001 |
| WO | 2004042971 | 5/2004 |
| WO | 2006129287 | 12/2006 |
| WO | 2009141016 | 11/2009 |

OTHER PUBLICATIONS

He, Changhua et al., "Analysis of the 802.11i 4-Way Handshake," Proceedings of the 3rd ACM Workshop on Wireless Security, pp. 43-50, Oct. 2004.

Lee, Jae Woo et al, "z2z: Discovering Zeroconf Services Beyond Local Link," 2007 IEEE Globecom Workshops, pp. 1-7, Nov. 26, 2007.

Perkins, C., et al., "Ad hoc On-Demand Distance Vector (AODV) Routing," Network Working Group, pp. 1-35, Oct. 2003.

International Application No. PCT/US2008/061674, International Search Report and Written Opinion dated Oct. 14, 2008.

International Application No. PCT/US2011/047591, International Search Report and Written Opinion dated Dec. 19, 2011.

International Application No. PCT/US2012/059093, International Search Report and Written Opinion dated Jan. 4, 2013.

Chirumamilla, Mohan K. et al., "Agent Based Intrustion Detection and Response System for Wireless LANs," CSE Conference and Workshop Papers, Paper 64, Jan. 1, 2003.

Craiger, J. Philip, "802.11, 802.1x, and Wireless Security," SANS Institute InfoSec Reading Room, Jun. 23, 2002.

Finlayson, Ross et al., "A Reverse Address Resolution Protocol," Nework Working Group, Request for Comments: 903 (RFC 903), Jun. 1984.

Wu, Haitao et al., "Layer 2.5 SoftMAC: End-System Based Media Streaming Support on Home Networks," IEEE Global Telecommunications Conference (GLOBECOM '05), vol. 1, pp. 235-239, Nov. 2005.

European Patent Application No. 12879114.2, Search Report dated Jan. 21, 2016.

European Patent Application No. 11823931.8, Search Report dated Aug. 29, 2016.

(56) References Cited

OTHER PUBLICATIONS

IEEE Computer Society, "IEEE Std 802.11i—Part 11: Wireless LAN Medium Access Control (MAC) and Physical Layer (PHY) Specifications—Amendment 6: Medium Access Control (MAC) Security Enhancements," Section H.4.1, pp. 165-166, Jul. 23, 2014.
Cisco Systems, Inc., "Wi-Fi Protected Access 2 (WPA 2) Configuration Example," Document ID 67134, Jan. 21, 2008 [retrieved online at https://www.cisco.com/c/en/us/support/docs/wireless-mobility/wireless-lan-wlan/67134-wpa2-config.html on Dec. 4, 2018].

\* cited by examiner

BUILDING AND MAINTAINING A NETWORK

CROSS-REFERENCE TO RELATED APPLICATIONS

This application claims priority to U.S. Patent Provisional Application Ser. No. 61/788,621, filed Mar. 15, 2013, which is incorporated herein by reference.

BACKGROUND

An area of ongoing research and development is improving the ease by which a person or an enterprise can set up a network. In particular importance is improving the ease by which a person or an enterprise can add devices to an already existing network to further expand and improve the network. Specifically, in establishing a network or adding devices to an already existing network, an administrator must configure the device in order to establish a new network or incorporate a new device into an already existing network. There therefore exists a need for systems in which a person or an enterprise can easily setup a network or add devices to an already existing network without having to configure the device.

Another area of ongoing research and development is improving the ease by which a network can be monitored and managed to continue to function if a device fails. Typical systems usually connect a plurality of network devices to a single server to manage the network device. Therefore, if the server fails, all of the network devices managed by the failed server are inoperable. There therefore exists a need for a system that monitors the servers or engines that manage network devices to determine whether or not they have failed. There also exists a need for a system capable of reassigning the network devices to different servers or engines that manage network devices in the event that a server or engine that manages network devices has failed.

The foregoing examples of the related art are intended to be illustrative and not exclusive. Other limitations of the relevant art will become apparent to those of skill in the art upon a reading of the specification and a study of the drawings.

SUMMARY

The following implementations and aspects thereof are described and illustrated in conjunction with systems, tools, and methods that are meant to be exemplary and illustrative, not necessarily limiting in scope. In various implementations, one or more of the above-described problems have been addressed, while other implementations are directed to other improvements.

Techniques and systems for building and maintaining a network. The technique involves assigning network devices to device management engines that mange the flow of data packets into and out of the network devices. The technique can include connecting a network device to an interregional redirector system. The network device can be a newly purchased device that is being powered on for the first time by the purchaser. The technique can include the interregional redirector system receiving network device information about the network device. The technique can also include the interregional redirector system validating the network device. The interregional redirector system can then assign the network to a load balancer system. The load balancer system can be associated with or part of one or multiple regional device management systems. The regional device management systems can be regionally unique in that they contain engines in specific regions or subregions. The load balancer systems can be regionally unique in that they are associated with or part of one or multiple regional network device management systems that are regionally unique. The interregional redirector system can assign the network device to a load balancer based upon the regions or subregions of the engines of the regional network device management systems or the engines themselves that which the load balancer systems are associated.

The technique can also involve a load balancer system assigning a network device to a network device management engine. The load balancer system can receive both network device information and network device management engine information. The load balancer system can assign the network device to a network device management engine based upon the regions or subregions of the network devices and the regions or subregions of the other network devices that they network device management engine already manages.

The technique can also include the load balancer system monitoring the status of the network device management engines associated with it and reassign network devices to different management engines in the event that one of the management engines fails. The load balancer system can monitor the status of the network device management engines associated with the load balancer system by retrieving network device management engine status messages from a network device management engine message queue. The status messages can be sent to the network device management engine message queue by the network device management engines. The load balancer system can use the status messages of the network device management engines to determine whether or not a network device management engine has failed. If the load balancer system determines that a network device management engine has failed, then the load balancer system can reassign the network device to another network device management engine that is not failing. The load balancer system can also send a notification to an administrator system that the network device management engine has failed.

These and other advantages will become apparent to those skilled in the relevant art upon a reading of the following descriptions and a study of the several examples of the drawings.

DETAILED DESCRIPTION OF THE INVENTION

Figure 1:
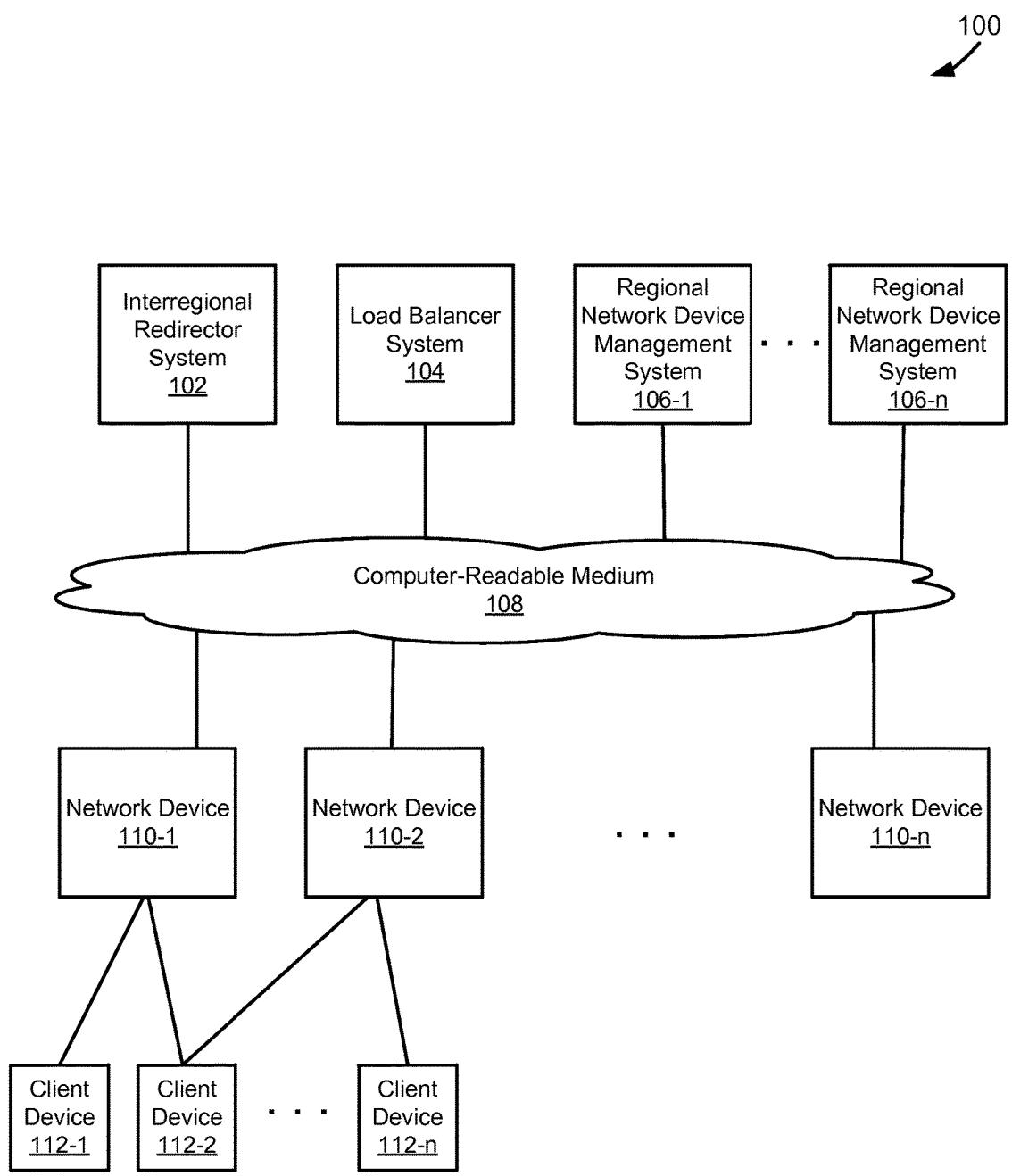
FIG. 1 depicts a diagram of an example of a system configured to couple a network device to a regional network device management system.

FIG. 1 depicts a diagram 100 of an example of a system configured to couple a network device to a regional network device management system. The system includes an interregional redirector system 102, a load balancer system 104, regional network device management systems 106-1 . . . 106-n, a computer readable medium 108, and network devices 110-1 . . . 110-n. As used in this paper, a system can be implemented as an engine or a plurality of engines.

While the system is shown to include multiple network devices 110-1 . . . 110-n, in a specific implementation, the system can only include one network device (e.g. 110-1). The network device s 110-1 . . . 110-n are coupled to client devices 112-1 . . . 112-n. Each client device can be coupled to a single network device 110-1 . . . 110-n (e.g. client device 112-1) or can be coupled to more than one network device (e.g. client device 112-2). The client devices 112-1 . . . 112-n can include a client wireless device, such as a laptop computer or a smart phone. The client devices 112-1 . . . 112-n can also include a repeater or a plurality of linked repeaters. Therefore, the client devices 112-1 . . . 112-n can be comprised of a plurality of repeaters and a client wireless device that can be coupled together as a chain.

A network device, as is used in this paper, can be an applicable device used in connecting a client device to a network. For example, a network device can be a virtual private network (hereinafter referred to as "VPN") gateway, a router, an access point (hereinafter referred to as "AP"), or a device switch. The network devices 110-1 . . . 110-n can be integrated as part of router devices or as stand-alone devices coupled to upstream router devices. The network devices 110-1 . . . 110-n can be coupled to the client devices 112-1 . . . 112-n through either a wireless or a wired medium. The wireless connection may or may not be IEEE 802.11-compatible. In this paper, 802.11 standards terminology is used by way of relatively well-understood example to discuss implementations that include wireless techniques that connect stations through a wireless medium. A station, as used in this paper, may be referred to as a device with a media access control (MAC) address and a physical layer (PHY) interface to a wireless medium that complies with the IEEE 802.11 standard. Thus, for example, client devices 112-1 . . . 112-n and network devices 110-1 . . . 110-n with which the client devices 112-1 . . . 112-n associate can be referred to as stations, if applicable. IEEE 802.11a-1999, IEEE 802.11b-1999, IEEE 802.11g-2003, IEEE 802.11-2007, and IEEE 802.11n TGn Draft 8.0 (2009) are incorporated by reference.

As used in this paper, a system that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description generally correlated with the IEEE 802.11 standards, as well as Wi-Fi Protected Access (WPA) and WPA2 security standards, and the Extensible Authentication Protocol (EAP) standard. In alternative implementations, a station may comply with a different standard than Wi-Fi or IEEE 802.11 and may be referred to as something other than a "station," and may have different interfaces to a wireless or other medium.

IEEE 802.3 is a working group and a collection of IEEE standards produced by the working group defining the physical layer and data link layer's MAC of wired Ethernet. This is generally a local area network technology with some wide area network applications. Physical connections are typically made between nodes and/or infrastructure devices (hubs, switches, routers) by various types of copper or fiber cable. IEEE 802.3 is a technology that supports the IEEE 802.1 network architecture. As is well-known in the relevant art, IEEE 802.11 is a working group and collection of standards for implementing wireless local area network (WLAN) computer communication in the 2.4, 3.6 and 5 GHz frequency bands. The base version of the standard IEEE 802.11-2007 has had subsequent amendments. These standards provide the basis for wireless network products using the Wi-Fi brand. IEEE 802.1 and 802.3 are incorporated by reference.

The network devices 110-1 . . . 110-n are coupled to the interregional redirector system 102, the load balancer system 104 and regional network device management systems 106-1 . . . 106-n through a computer-readable medium 108. The computer-readable medium 108 is intended to represent a variety of potentially applicable technologies. For example, the computer-readable medium 108 can be used to form a network or part of a network. Where two components are co-located on a device, the computer-readable medium 108 can include a bus or other data conduit or plane. Where a first component is co-located on one device and a second component is located on a different device, the computer-readable medium 108 can include a wireless or wired back-end network or LAN. The computer-readable medium 108 can also encompass a relevant portion of a WAN or other network, if applicable.

The computer-readable medium 108, the interregional redirector system 102, the load balancer system 104, the regional network device management systems 106-1 . . . 106-n, and other applicable systems described in this paper can be implemented as parts of a computer system or a plurality of computer systems. A computer system, as used in this paper, is intended to be construed broadly. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. As used in this paper, the term "computer-readable storage medium" is intended to include only physical media, such as memory. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The bus can also couple the processor to the non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network.

The computer systems described throughout this paper can be compatible with or implemented through one or a plurality of cloud-based computing systems. As used in this paper, a cloud-based computing system is a system that provides virtualized computing resources, software and/or information to client devices. The computing resources, software and/or information can be virtualized by maintaining centralized services and resources that the client devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

The computer systems described throughout this paper can be implemented as or can include engines to perform the functions of each system. An engine, as used in this paper, includes a dedicated or shared processor and, typically, firmware or software modules executed by the processor. Depending upon implementation-specific or other considerations, an engine can be centralized or its functionality distributed. An engine can include special purpose hardware, firmware, or software embodied in a computer-readable medium for execution by the processor.

The engines described throughout this paper can be cloud-based engines. A cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

The computer systems described throughout this paper can include datastores. A datastore, as described in this paper, can be cloud-based datastores compatible with a cloud-based computing system.

The regional network device management systems 106-1 . . . 106-$n$ can function to manage the network devices 110-1 . . . 110-$n$. Each regional network device management system 106-1 . . . 106-$n$ can include a plurality of engines that manage the network devices 110-1 . . . 110-$n$. The engines can be grouped into regional network device management systems 106-1 . . . 106-$n$ based upon regions and subregions of the network devices 110-1 . . . 110-$n$ that the engines manage. Therefore the regional network device management systems 106-1 . . . 106-$n$ can be characterized by the regions and subregions of the network devices 110-1 . . . 110-$n$ that the engines within a specific network device management system 106-1 . . . 106-$n$ manage. For example, the engines that manage network devices 110-1 . . . 110-$n$ in the same region or subregion can be grouped into the same regional network device management system (e.g. 106-1). As a result, the regional network device management systems 106-1 . . . 106-$n$ can be regionally unique in that they contain engines that manage network devices 110-1 . . . 110-$n$ within specific regions or subregions.

As the regional network device management systems 106-1 . . . 106-$n$ can be implemented as a cloud-based system, and as the regional network device management systems 106-1 . . . 106-$n$ can be characterized by the region and subregions of the network devices 110-1 . . . 110-$n$, the regional network device management systems 106-1 . . . 106-$n$ can be organized or located at regions within the cloud based upon the regions and subregions of the network devices 110-1 . . . 110-$n$. Specifically, the regional network device management systems 106-1 . . . 106-$n$ can be organized or located at regions within the cloud based upon the regions or the subregions of the network devices 110-1 . . . 110-$n$ that the regional network device management systems 106-1 . . . 106-$n$ manage. In a specific implementation, the subregions of the network devices 110-1 . . . 110-*n* together form a region of the network devices 110-1 . . . 110-*n*.

The regions or subregions of the network devices 110-1 . . . 110-*n* can be defined based upon geography, an enterprise network or a combination of both geography and an enterprise network. In a specific implementation, the region can be defined based upon geography to include the network devices 110-1 . . . 110-*n* associated with or located within a geographical area or location, such as a city or a building within a city. Similarly, a subregion can be defined to include the network devices 110-1 . . . 110-*n* located in or associated with a geographical area or location within the geographical area or location used to define the region. For example, the region can be defined to include the network devices 110-1 . . . 110-*n* located in or associated with a state, while the subregion can be defined to include the network devices 110-1 . . . 110-*n* located in or associated with a city in the state that defines the region. In another implementation, the region can be defined based upon an enterprise to include the network devices 110-1 . . . 110-*n* associated with or are used in an enterprise network. In yet another implementation, the region can be defined based upon a combination of both geography and an enterprise to include the network devices 110-1 . . . 110-*n* associated with or located within a geographical location or area within an enterprise network. For example, the region can include the network devices 110-1 . . . 110-*n* associated with or located within a specific office site of the enterprise.

The regions of the network devices 110-1 . . . 110-*n* can not only be defined according to the previously described classifications but can also be defined based upon the number of network devices 110-1 . . . 110-*n* in or associated with the region. In a specific implementation, the region can be defined to include only basic service set (BSS). A BSS includes one network device and all of the stations or other devices (i.e. repeaters) coupled to the network device. The BSS can be identified by a unique basic service set identification (BSSID). The BSSID can be the MAC address of the network device in the BSS. In another implementation, the region can be defined to include an extended service set (ESS) that comprises plurality BSSs. The plurality of BSSs can be interconnected so that stations or devices are connected to multiple network devices within the ESS. The ESS can be identified by a unique extended service set identification (ESSID). The ESSID can be the MAC addresses of the network devices in the ESS.

The system shown in FIG. 1 includes a load balancer system 104 coupled to the regional network device management systems 106-1 . . . 106-*n* and the network devices 110-1 . . . 110-*n* through the computer readable medium 108. The load balancer system 104 is also coupled to the interregional redirector system 102 through the computer-readable medium 108. The system can include multiple load balancer systems 104 that can be coupled to and associated with different regional network device management systems 106-1 . . . 106-*n*. In a specific implementation, the specific regional network device management systems 106-1 . . . 106-*n* that the load balancer system 104 is coupled to and associated with can be based upon the regions and subregions of the network devices 110-1 . . . 110-*n* that the engines within the specific regional network device management systems 106-1 . . . 106-*n* manage. For example, a load balancer system 104 can be coupled to and associated with the regional network device management systems 106-1 . . . 106-*n* that manage the network devices 110-1 . . . 110-*n* within an entire state. As the load balancer systems 104 can be coupled to and associated with specific regional network device management systems 106-1 . . . 106-*n* based on the regions or the subregions of the network devices 110-1 . . . 110-*n* that the engines within the specific regional network device management systems 106-1 . . . 106-*n* manage, the load balancer systems 104 can be regionally unique. For example, the load balancer systems 104 can be regionally unique in that they are associated with network devices 106-1 . . . 106-*n* in the same enterprise network.

Additionally, a specific regional network device management system 106-1 . . . 106-*n* can be coupled to or associated with multiple load balancer systems 104 based upon the regions and subregions of the network devices 110-1 . . . 110-*n* managed by the engines in the specific regional network device management system 106-1 . . . 106-*n*. For example, a specific regional network device management system 106-1 . . . 106-*n* can be coupled to or associated with a first load balancer system 104 because the specific regional network device management system 106-1 . . . 106-*n* contains engines that manage network devices 110-1 . . . 110-*n* in a specific region, such as a state. Additionally, the specific regional network device management system 106-1 . . . 106-*n* can also be coupled to or associated with a second load balancer system 104 because the specific regional network device management system 106-1 . . . 106-*n* contains engines that manage network devices 110-1 . . . 110-*n* in a subregion of the specific region, such as a city within the state.

The load balancer system 104, as will be discussed in greater detail later with respect to FIG. 2, can function to monitor the usage of specific engines grouped into regional network device management systems 106-1 . . . 106-*n* as the engines within the regional network device management systems 106-1 . . . 106-*n* manage various network devices 110-1 . . . 110-*n*. The load balancer system 104 can also function to assign a network device 110-1 . . . 110-*n* to one or a plurality of engines within one or more of the regional network device management systems 106-1 . . . 106-*n* so that the assigned engine or engines can manage the assigned network devices 110-1 . . . 110-*n*. The load balancer system 104 can also function to assign a network device 110-1 . . . 110-*n* to another load balancer system 104 that can then assign the network devices 110-1 . . . 110-*n* to another load balancer system 104 or one or a plurality of engines within one or more of the regional network device management systems 106-1 . . . 106-*n*. In a specific implementation, the load balancer systems 104 can assign a newly purchased network device 110-1 . . . 110-*n* to either or both another load balancer system 104 and engines in a regional network device management system 106-1 . . . 106-*n*.

The load balancer systems 104 can assign the network devices 110-1 . . . 110-*n* to specific engines within the regional network device management systems 106-1 . . . 106-*n* based upon the regions or subregions of the other network devices 110-1 . . . 110-*n* that the specific engines manage. The load balancer systems 104 can assign the network devices 110-1 . . . 110-*n* to other load balancers systems. The other load balancer systems can be coupled to or associated with specific engines within the regional network device management systems 106-1 . . . 106-*n*. Specifically, the other load balancer systems can be associated with specific engines within the regional network device management systems 106-1 . . . 106-*n* based upon the regions or subregions of the network devices 110-1 . . . 110-*n* that the other load balancer systems assign.

The system shown in the example of FIG. 1 includes an interregional redirector system 102. The interregional redirector system 102 is coupled to the network devices 110-1 . . . 110-*n* and the load balancer systems 104 through the computer readable medium 108. In a specific implementation, the interregional redirector system 102 is not associated with any specific region. Specifically, the interregional redirector system 102 can be coupled to all of the load balancer systems 104, and through the load balancer systems to all of the regional network device management systems 106-1 . . . 106-*n*. As the regional network device management systems 106-1 . . . 106-*n* and the load balancer systems 104 can be regionally unique, and as the interregional redirector system 102 can be coupled to all of the regional network device management systems 106-1 . . . 106-*n*, the interregional redirector system 102 is associated with every region or subregion. Therefore, the interregional redirector system 102 is not unique to a single region, but is rather globally applicable to at least a subplurality of the regions.

In being coupled to the network devices 110-1 . . . 110-*n*, the interregional redirector system 102 can function to receive identification information from the network devices 110-1 . . . 110-*n* and validate the network devices. In being coupled to the load balancer systems 104, the interregional redirector system 102 can further function to assign specific network devices 110-1 . . . 110-*n* to one or a plurality of load balancer systems 104. As the load balancer systems can be regionally unique, the interregional redirector system 102 can assign the network devices 110-1 . . . 110-*n* to one or a plurality of specific load balancer systems 104 based upon the regions or subregions of the network devices 110-1 . . . 110-*n* that are being assigned.

In a specific implementation, a newly purchased network device 110-1 . . . 110-*n* is configured to be directed to the interregional redirector system 102 upon the first turning on of the network device 110-1 . . . 110-*n* by the purchaser of the network device. In being directed to the interregional redirector system 102, the network device 110-1 . . . 110-*n* can send the identification information of the network device to the interregional redirector system 102. The interregional redirector system 102 can both validate the network device 110-1 . . . 110-*n* and assign the newly purchased network device 110-1 . . . 110-*n* based on the region or subregion of the network device to one or a plurality of load balancer systems 104. The one or a plurality of load balancer systems 104 can then assign the newly purchased network device 110-1 . . . 110-*n* to one or a plurality of regional network device management systems 106-1 . . . 106-*n*. In another example, additional server resources, such as additional new regional network device management systems can be added and the load balancer system 104 can assign the newly purchased network device 110-1 . . . 110-*n* to an added new regional network device management system.

In a specific implementation, the regions or subregions of the network devices 110-1 . . . 110-*n* can be part of the identification information received by the interregional redirector system 102 from the network devices 110-1 . . . 110-*n*. In another implementation, the interregional redirector system 102 can trace through the computer readable medium 108 to determine the region or subregion of the newly purchased network device 110-1 . . . 110-*n*. Alternatively, the interregional redirector system 102 can trace through the computer readable medium 108 the regions or subregions of already activated network devices 110-1 . . . 110-*n* that neighbor the newly purchased network device 110-1 . . . 110-*n* either physically or on a network structure level to determine the region or subregion of the newly purchased network device 110-1 . . . 110-*n*. The interregional redirector system 102 can determine the regions or subregions of neighboring network devices 110-1 . . . 110-*n* based upon the MAC addresses of the neighboring network devices 110-1 . . . 110-*n*. In an alternate implementation, the interregional director system 102 can determine the region or subregion of the newly purchased network device 110-1 . . . 110-*n* through the identity of the purchaser of the network device. Specifically, the interregional redirector system 102 can use the MAC address of the newly purchased network device 110-1 . . . 110-*n* that can be received from the newly purchased network device 110-1 . . . 110-*n* to determine the identity of the purchaser of the network device 110-1 . . . 110-*n* and the region or subregion of the network device 110-1 . . . 110-*n*. For example, the interregional redirector system 102 can determine that company A purchased the network device 110-1 . . . 110-*n* and because company A occupies a specific location within a region, such as a city, determine that the city is the region of the newly purchased network device 110-1 . . . 110-*n*.

Figure 2:
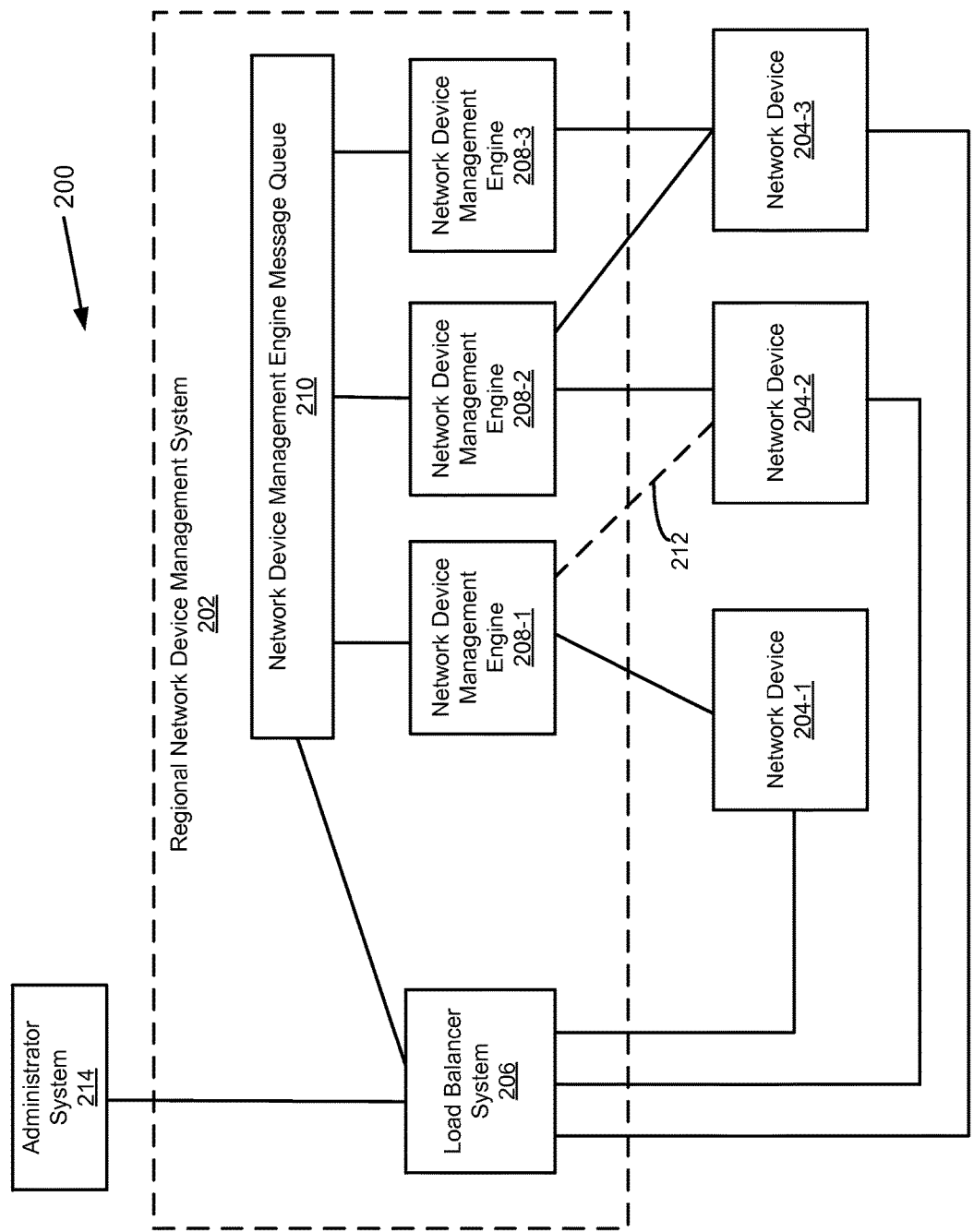
FIG. 2 depicts a diagram of an example of a system configured to couple a network device to a network device management engine and monitor the network device management engine.

FIG. 2 depicts a diagram 200 of an example of a system configured to couple a network device to a network device management engine and monitor the network device management engine. The system includes a regional network device management system 202 coupled to network devices 204-1, 204-2 and 204-3. While only three network devices 204-1, 204-2 and 204-3 are shown, the regional network device management system 202 can be coupled to more or less than three network devices. The system can also include an administrator system 214 coupled to the regional network device management system 202.

The regional network device management system 202 includes a load balancer system 206, network device management engines 208-1, 208-2 and 208-3 and a network device management engine message queue 210. While only three network device management engines 208-1, 208-2 and 208-3 are shown, the regional network device management system 202 can include more or less than three network device management engines.

The network device management engines 208-1, 208-2 and 208-3, within the regional network device management systems 202, are coupled to the network devices 204-1, 204-2 and 204-3. A network device (e.g. 204-3) can be coupled to more than one network device management engines (e.g. 208-2 and 208-3). The network device management engines (e.g.

208-1) can manage the flow of data into and out of the network devices (e.g. 204-1) coupled to the specific network device management engines (e.g. 208-1). The network device management engines (e.g. 208-1) can be regionally unique in that they manage the flow of data into and out of the network devices in specific regions or subregions. Furthermore, the network device management engines can be grouped into a network device management system 202 based upon the regions or subregions of the network devices that the network device management engines manage.

In a specific implementation, the network device management engines 208-1, 208-2 and 208-3 can manage the flow of data into and out of the network devices 204-1, 204-2 and 204-3 by controlling routers connected to the network devices. In another implementation, the network device management engines 208-1, 208-2 and 208-3 can control the flow of data into and out of the network devices 204-1, 204-2 and 204-3 by functioning as a router themselves, and switching between different data paths coupled to the network device management engines. For example, network device management engines 208-1, 208-2 and 208-3 that manage network devices 204-1, 204-2 and 204-3 within the same region or subregion can be grouped into the same network device management system 202.

The network device management engines 208-1, 208-2 and 208-3 can be a server that can perform the previously described functions. In a specific implementation, the network device management engines 208-1, 208-2 and 208-3 can be configured in accordance with the control and provisioning of wireless access points (CAPWAP) protocol. Specifically, the network device management engines 208-1, 208-2 and 208-3 can be CAPWAP servers. CAPWAP servers are servers that can be configured in accordance with the CAPWAP protocol. The CAPWAP protocol is similar to the light weight access point protocol (LWAPP), but differs in that it includes the integration of a full datagram transport layer security (DTLS) tunnel. Data is transmitted through the CAPWAP protocol over an unencrypted data channel while control messages of the data are transmitted in the DTLS tunnel. The CAPWAP protocol is described in RFC 5415 (2009), which is hereby incorporated by reference, and IEEE 802.11 which was previously incorporated by reference.

In a specific implementation, the network devices 204-1, 204-2 and 204-3 can function to determine whether a network device management engine 208-1, 208-2 and 208-3 that the network devices are coupled to has failed. For example, if a network device 204-1, 204-2 and 204-3 does not receive traffic from a network device management engine 208-1, 208-2 and 208-3 that is coupled to the network device, then the network device can determine that the network device management engine has failed. Further in the specific implementation, the network device 204-1, 204-2 and 204-3 can alert the load balancer system 206 to a failure of a network device management engine 208-1, 208-2 and 208-3. For example, upon detecting a failure in a network device management engine 208-1, 208-2 and 208-3 can generate and send a network device management engine failure message to the load balancer system 206. In one example, the network device management engine failure message identifies the specific network device management engine 208-1, 208-2 and 208-3 that has failed.

The network device management engines 208-1, 208-2 and 208-3 are coupled to the network device management engine message queue 210. The network device management engine message queue 210 is coupled to the load balancer system 206. The network device management engine message queue 210 can function to receive status messages sent from the network device management engines 208-1, 208-2 and 208-3. The status messages can be sent from the network device management engines 208-1, 208-2 and 208-3 periodically, after a predetermined interval of time. In another implementation the status messages can be sent from the network device management engines 208-1, 208-2 and 208-3 when the load balancer system 206 sends a status request to the network device management engines 208-1, 208-2 and 208-3.

The status messages sent from the network device management engine 208-1, 208-2 and 208-3 can include the amount of used bandwidth and available bandwidth that exist on network devices coupled to the specific network device management engines 208-1, 208-2 and 208-3. The status messages can also include information about the number of network devices 204-1, 204-2 and 204-3 that the network device management engines 208-1, 208-2 and 208-3 are managing. The status messages can further include the amount of bandwidth on the network device management engines 208-1, 208-2 and 208-3 that each network device 204-1, 204-2 and 204-3 is using. In a specific implementation, the regions and subregions of the network devices 204-1, 204-2 and 204-3 that the network device management engines 208-1, 208-2 and 208-3 are managing is included in the status messages. Further, the status message can include the amount of memory available and is being used by the network device management engines 208-1, 208-2 and 208-3 and how much memory of the network device management engines is being used by each network device 204-1, 204-2 and 204-3 managed by the network device management engines 208-1, 208-2 and 208-3.

The load balancer system 206 is also coupled to the network devices 204-1, 204-2 and 204-3. The load balancer system 206 can become coupled to network devices 204-1, 204-2 and 204-3 when the network device 204-1, 204-2 and 204-3 is assigned to the specific load balancer system 206 of a specific regional network device management system 202. The network devices 204-1, 204-2 and 204-3 can be assigned to a specific load balancer system 206 within a specific regional network device management system 202 by either another load balancer system 104 or the interregional redirector system 102, shown in FIG. 1. As discussed previously with FIG. 1, the network device 204-1, 204-2 and 204-3 can be assigned to a specific regional network device management system 202 based on the region or subregion of the network device 204-1, 204-2 and 204-3.

The load balancer system 206 can function to assign a network device 204-1, 204-2 and 204-3 to a network device management engine 208-1, 208-2 and 208-3 when the network device 204-1, 204-2 and 204-3 is assigned to the load balancer system 206. In a specific implementation, the load balancer system 206 can assign a newly purchased network device 204-1, 204-2 and 204-3 to a network device management engine 208-1, 208-2 and 208-3. The load balancer system 206 can assign a network device 204-1, 204-2 and 204-3 to a network device management engine 208-1, 208-2 and 208-3 based upon the region or subregion of the network devices already assigned to a network device management engine. For example, the load balancer system 206 can assign a network device 204-1, 204-2 and 204-3 to a network device management engine 208-1, 208-2 and 208-3 that already manages network devices in the same or related region or subregion of the network device that is being assigned.

Additionally, the load balancer system 206 can assign the network device 204-1, 204-2 and 204-3 to one or a plurality of network device management engines 208-1, 208-2 and 208-3 based in part upon the status message that the load balancer system 206 reads for each network device management engine 208-1, 208-2 and 208-3 from the network device management engine message queue 210. For example, if the status messages retrieved by the load balancer system 206 indicate that network device management engine 208-1 has a greater amount of bandwidth than network device management engine 208-2, the load balancer system 206 can assign network device 204-1 to network device management engine 208-1. As a result, network device 204-1 is managed by network device management engine 208-1. In another implementation, the load balancer system 206 can also assign the network device 204-1, 204-2 and 204-3 to a network device management engine 208-1, 208-2 and 208-3 based not only on the available bandwidth of the network device management engines, but also on the expected amount of resources, such as bandwidth that the specific network device 204-1, 204-2 and 204-3 will use from the network device management engines.

The load balancer system 206 can also function to monitor the status of the network device management engines 208-1, 208-2 and 208-3 and reassign the network devices 204-1, 204-2 and 204-3 to other network device management engines in the event of a failure of the network device management engine or engines 208-1, 208-2 and 208-3 to which specific network devices are assigned. For example, the load balancer system 206 can detect a failure in network device management engine 208-1 connected along dashed line 212 to network device 204-2. In response to the failure of network device management engine 208-1, the load balancer system 206 can assign the network device 204-2 to network device management engine 208-2 that is not failing.

In a specific implementation, the load balancer system 206 detects a failure of a network device management engine 208-1, 208-2 and 208-3 when the network device management engine does not send a status message to the network device management engine message queue 210. In another implementation, the load balancer system 206 detects a failure of a network device management engine 208-1, 208-2 and 208-3 when the engine does not send a specific number of status messages to the network device management engine message queue 210. The number of status messages that a network device management engine 208-1, 208-2 and 208-3 fails to send to the network device management engine message queue 210 before the load balancer system 206 determines that a failure has occurred can be predefined. In another implementation, the load balancer system 206 detects a failure of a network device management engine 208-1, 208-2 and 208-3 when the status message sent by a network device management engine indicates that the resources of the engine reach a certain level. For example, the load balancer system 206 can detect a failure of one of the specific network device management engine 208-1, 208-2 and 208-3 when the amount of available bandwidth of the specific network device management engines falls below a certain predefined available bandwidth level.

In a specific implementation, the load balancer system 206 functions to detect a failure of a network device management engine based on network device management engine failure messages generated by the network devices 204-1, 204-2 and 204-3. For example, if the load balancer system 206 receives a network device management engine failure message from the network devices 204-1, 204-2 and 204-3 identifying the specific network device management engine 208-1, 208-2 and 208-3 that has failed, then the load balancer system 206 can determine/detect that the specific network device management engine 208-1, 208-2 and 208-3 has failed.

In a specific implementation, if the load balancer system 206 detects a failure in one of the network device management engines 208-1, 208-2 and 208-3, the load balancer system 206 can reassign the one or plurality of network devices 204-1, 204-2 and 204-3 connected to the network device management engine to other network device management engines in either the same regional network device management system 202 or different regional network device management systems. Alternatively, the load balancer system 206 can reassign all of the network devices 204-1, 204-2 and 204-3 connected to a failed network device management engine 208-1, 208-2 and 208-3 to one or a plurality of other network device management engines. In yet another alternative, the load balancer system can reassign a portion of the network devices 204-1, 204-2 and 204-3 connected to a failed network device management engine 208-1, 208-2 and 208-3 so that the failed network device management engine is cured, and is no longer failing. For example, if an network device management engine is failing due to a lack of available bandwidth, the load balancer system 206 can reassign a portion of the network devices assigned to the failed network device management engine so that the available bandwidth of the failing network device management engine is increased to a level where the network device management engine is no longer failing.

The load balancer system 206 can also be coupled to the administrator system 214, thereby coupling the regional network device management system 202 to the administrator system 214. The load balancer system 206 can send a notification to the administrator system 214 in the event that the load balancer system detects a failure of one of the network device management engines 208-1, 208-2 and 208-3 from the status messages sent to the network device management engine queue 210. In a specific implementation, when the load balancer system 206 detects a failure of one of the network device management engines 208-1, 208-2 and 208-3 because a specific network device management engine does not send a status message to the network device management engine message queue 210, the load balancer system can send a notification to the administrator system 214. The notification sent to the administrator system can include the reason why the load balancer system 206 detects a fault in a specific network device management engine, such as a failure caused by not sending a status message to network device management engine message queue 210, or caused by the resources of a specific network device management engine have reached a specific level. The administrator system 214 can include a computer implemented process for fixing the failed network device management engine based upon the reason why the load balancer system 206 detects a failure in a specific network device management engine.

Figure 3:
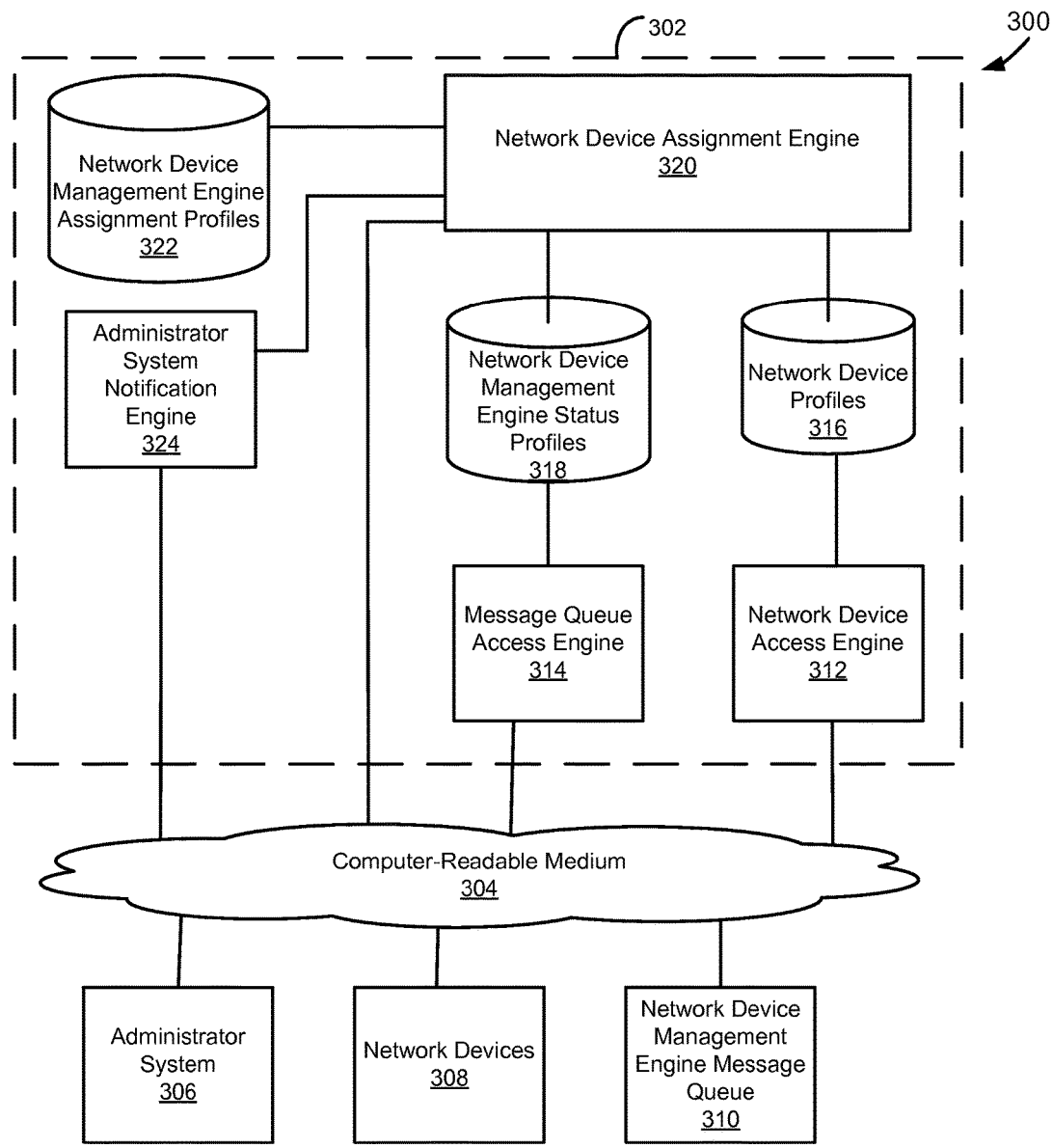
FIG. 3 depicts a diagram of an example of a load balancer system.

FIG. 3 is a diagram 300 of an example of a load balancer system 302. The load balancer system 302 can be configured to assign network devices to network device management engines, monitor the status of the network management engines, reassign a network device to a new network device management engine if the network device management engine fails and notify the administrator system of a failure of a network management engine.

In the example of FIG. 3, the load balancer system 302 is coupled through computer-readable medium 304 to an administrator system 306, network devices 308 and the network device management engine message queue 310. The load balancer system 302 includes a message queue access engine 314 coupled through the computer readable medium to the network device management engine message queue 310. The message queue access engine 314 can be configured to retrieve status information of network device management engines from the status messages in the network device management engine message queue 310. The status messages can include information as to the status of the network device management engines, such as the amount of available bandwidth on the network device management engines. The status message also can include information as to when a status message was sent to the network device management engine message queue 310, which can be used to determine whether a network device management engine has stopped sending status messages, and thus may have failed. The message queue access engine 314 can be configured to retrieve status information each time a status message is sent to the network device management engine message queue 310. The status information retrieved by the message queue access engine 314 can be stored on a network device management engine status profiles datastore 318.

The load balancer system 302 can also include a network device access engine 312. The network device access engine 312 can be coupled to network devices 308 coupled to the load balancer system 302 through computer-readable medium 304. The network device access engine 312 can be configured to retrieve or receive information from network devices 308 coupled to the load balancer system 302. In a specific implementation, the network device access engine 312 is configured to retrieve or receive information from newly purchased network devices 308 coupled to the load balancer system 302 for the first time. The newly purchased network devices can become coupled to the load balancer system 302 after being assigned to the load balancer system 302 by either or both another load balancer system or an interregional redirector system, as is shown in FIG. 1. The information retrieved or received by the network device access engine 312 can include the region or subregions of the network device 308. The information can also include the amount of bandwidth that the network device 308 expects to use. The network device access engine 312 can store the information retrieved or received from the network devices 308 on a network device profiles datastore 316.

The load balancer system 302 includes a network device assignment engine 320. The network device assignment engine 320 is coupled to the network device management engine status profiles datastore 318 and the network device profiles datastore 316. The network device assignment engine 320 is also coupled to the network devices 308 through the computer-readable medium 304. The network device assignment engine 320 can function to assign a network device 308 to one or a plurality of network device management engines. Specifically, as the network devices 308 are coupled to the network device assignment engine 320, in assigning the network devices 308 to network device management engines, the network device assignment engine 320 can direct the network devices 308 to couple to network device management engines, so that the engines can manage the flow of data packets into and out of the network devices 308. The network device assignment engine 320 can store the assignment information on the network device management engine assignment profiles datastore 322. The assignment information can include which network devices 308 are assigned to be managed by specific network device management engines.

The network device assignment engine 320 can also function to determine that a network device 308 is assigned to a failing network device management engine and reassign the network device 308 to another one or plurality of network device management engines that are not failing. Specifically, the network device assignment engine 320 can determine that a network device management engine is failing form the information stored in the network device management engine status profiles datastore 318. The network device assignment engine can then determine which network devices 308 are being managed by the specific network device management engine that is failing from the network device management engine assignment profiles datastore 322. The network device assignment engine 320 can then reassign the network devices 308 that are being managed by failing network device management engines to different network device management engines that are not failing. In a specific implementation, in reassigning the network devices 308 to different network device management engines the network device assignment engine 320 can use the information about the network devices 308 stored in the network device profiled datastore 316. For example, the network device assignment engine 320 can use the information about the region or subregion of the network device 308 to reassign the network device 308 to another network device management engine.

The network device assignment engine 320 can also be coupled to the administrator system notification engine 324. The administrator system notification engine 324 is coupled to the administrator system 306 through the computer-readable medium 304. In a specific implementation, the network device assignment engine 320 can function to initiate the sending of a notification about the failure of an AP management engine to the administrator system 306. Specifically, the network device assignment engine 320 can send failure information about a network device management engine to the administrator system notification engine 324. The failure information can include why the network device assignment engine 320 has determined that a network device management engine has failed. The administrator system notification engine 324 can send a notification to the administrator system that a network device management engine has failed, as can be determined by the network device assignment engine 320. The notification sent by the administrator system notification engine 324 can include the information used by the network device assignment engine 320 to determine that the network device management engine has failed.

Figure 4:
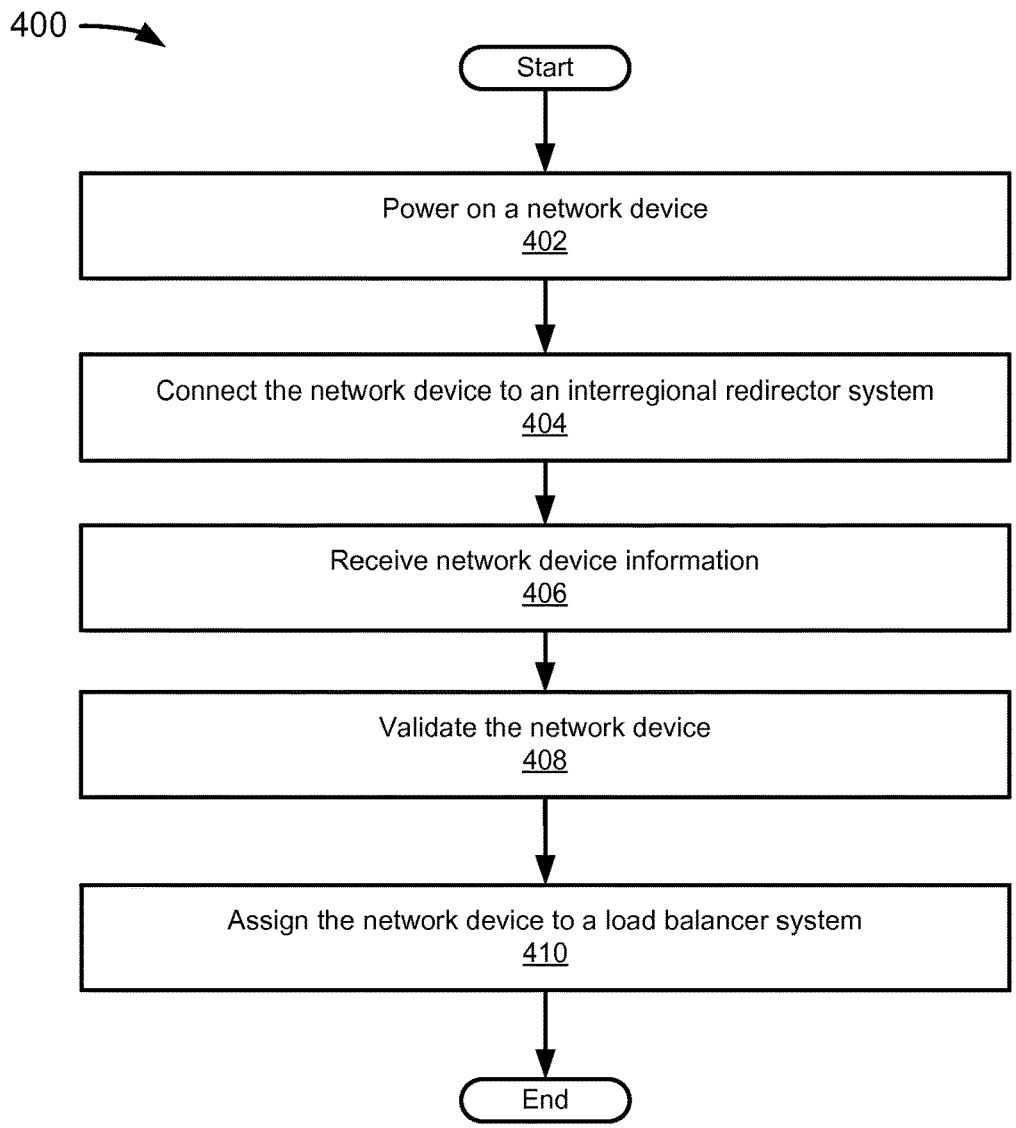
FIG. 4 depicts a flowchart of an example of a method for assigning a network device to a regional network device management system.

FIG. 4 depicts a flowchart 400 of an example of a method for assigning a network device to a regional network device management system. The flowchart starts at module 402 with powering on a network device. In a specific implementation, the network device can be a newly purchased device that is powered on for the first time by the purchaser of the network device.

In the example of FIG. 4, the flowchart continues to module 404 with connecting the network device to the interregional redirector system. The flowchart continues to module 406 where the interregional redirector system receives information about the network device connected to the interregional redirector system at module 404. The information about the network device can include information about the region or subregion of the network device. The information about the network device can also include the MAC address of the network device and information about the purchaser of the network device. The information about the network device can also include the amount of bandwidth that the network device expects to use.

The flowchart then continues to module 408, where the network device is validated. In one example, the interregional redirector system validates the network device by using the MAC address received from the network device. The flowchart continues to module 410, where the network device is assigned to a load balancer system. In one example, the interregional redirector system can assign the network device to a load balancer system based on the region or the subregion of the network device. In another example, the load balancer system can be associated with a single or multiple regional AP management systems. In still another example, the region or the subregion of the network device can be determined form the network device at module 406.

Figure 5:
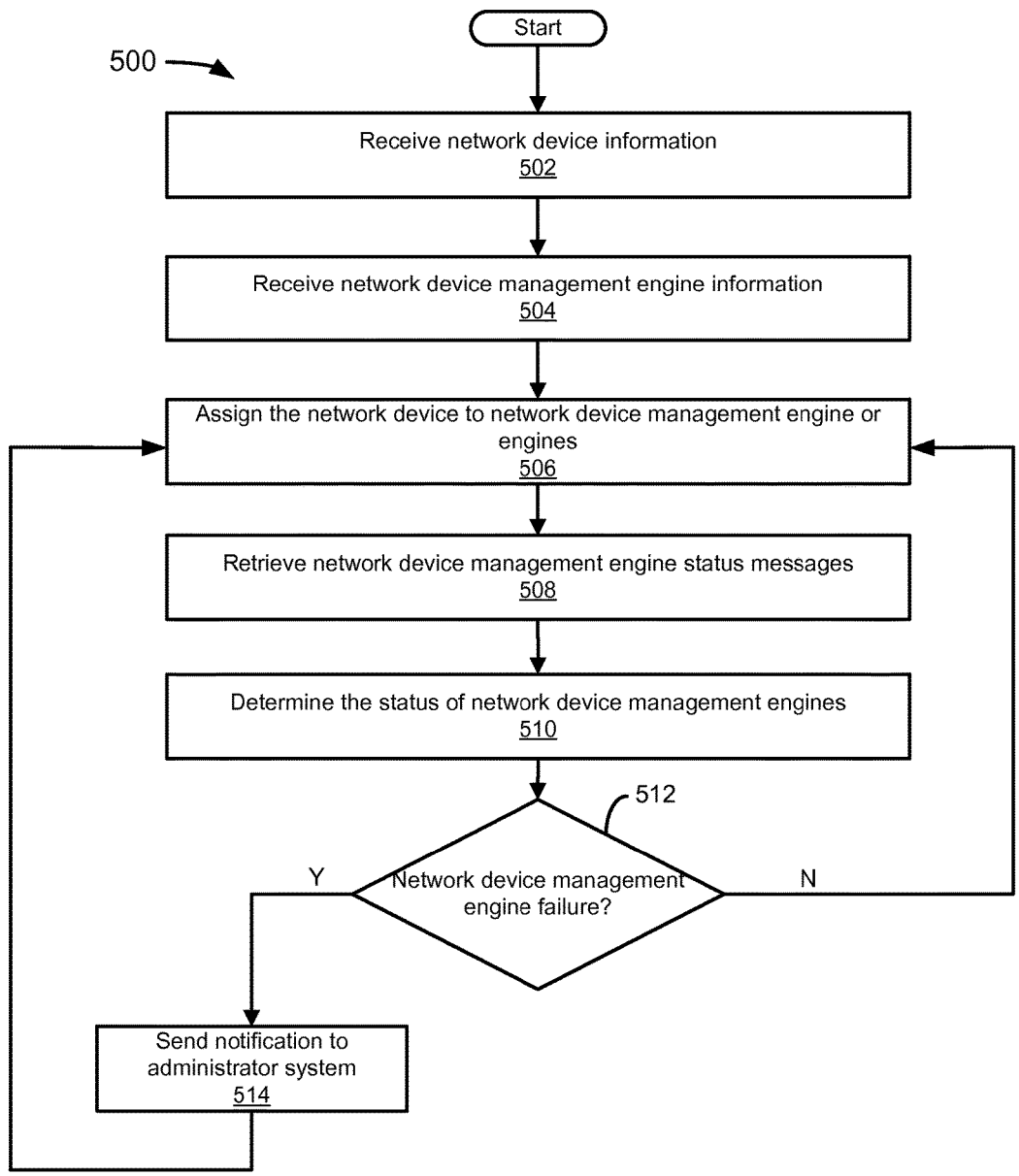
FIG. 5 depicts a flowchart of an example of a method of a load balancer system for assigning a network device to a network device management engine.

FIG. 5 depicts a flowchart 500 of an example of a method of a load balancer system assigning a network device to a network device management engine. In one example, the flowchart can further include the load balancer system determining whether or not a network device management engine has failed and reassigning network devices that are being managed by the failed network device management engine to other network device management engine.

The flowchart beings at module 502, where a load balancer system receives network device information. The network device information can be received from a network device assigned to the load balancer system or from another load balancer system or interregional redirector system that assigns the network device to the load balancer system. The network device information can include information about the region or the subregion of the network device assigned to the load balancer system. The flowchart continues to module 504, where the load balancer system receives network device management engine information. The management engine information can be status information of the network device management engines. The status information can be determined by the load balancer system from messages sent to a network device management engine message queue from network device management engines. The status information can include the amount of bandwidth available on a network device management engine. The status information can also include whether or not the network device management engine has failed. The status information can also include any other information related to network device management engines that has been discussed in this paper.

The flowchart continues to module 506 where the load balancer system assigns a network device to a network device management engine or a plurality of network device management engines for management of the network device. As discussed previously, the load balancer system can assign a network device to a network device management engine based on the region of the network device and the regions or subregions of the other network devices that the assigned network device management engine are managing. The load balancer system can also assign a network device to a network device management engine based on the amount of available bandwidth that the network device management has or any other method described in this paper.

The flowchart continues to module 508, where the load balancer system retrieves network device management engine status messages from a network device management engine message queue. The status messages can include information as to the amount of available bandwidth that a network device management engine has. The status messages can also include time stamps to determine when the status message was sent to the network device management engine message queue by the network device management engines. The load balancer system can continuously retrieve status messages form the network device management engine message queue, or at set times when the network device management engines are scheduled to send a status message.

The flowchart continues to module 510, where the load balancer system monitors a network device management engine and determines the status of a network device management engine. The load balancer system can use the number of times that a network device management engine was supposed to send a status message and did not do so in order to determine the status of the network device management engine. Alternatively, the load balancer system can use the available bandwidth to determine the status of a network device management engine.

The flowchart continues to decision point 512, where the load balancer system determines whether the network device management engine has failed. The load balancer system can determine whether a network device management engine has failed based on the status of the network device management engine determined at module 510. For example, if the network device management engine was supposed to send a status message and did not do so, then the load balancer system can determine that the network device management engine has failed. Alternatively, if the network device management engine does not have enough available bandwidth or the network devices coupled to the network device management engine do not have enough available bandwidth then the load balancer system can determine that the network device management engine has failed. If it is determined at decision point 512, that the network device management engine has not failed, then the flowchart proceeds to module 508, where the load balancer system retrieves network device management engine status messages. At decision point 512, if the load balancer system determines that a network device management engine has failed, then the flowchart continues to module 514, where the load balancer system sends a notification to an administrator system that a specific network device management engine has failed. The flowchart then proceeds to module 506, where the load balancer system reassigns the network device to a new network device management engine. In an alternative implementation, if the load balancer system determines at decision point 512 that a network device management engine has failed, then the flowchart skips module 514 and proceeds to module 506, where the load balancer system reassigns the network device to a new network device management engine.

Figure 6:
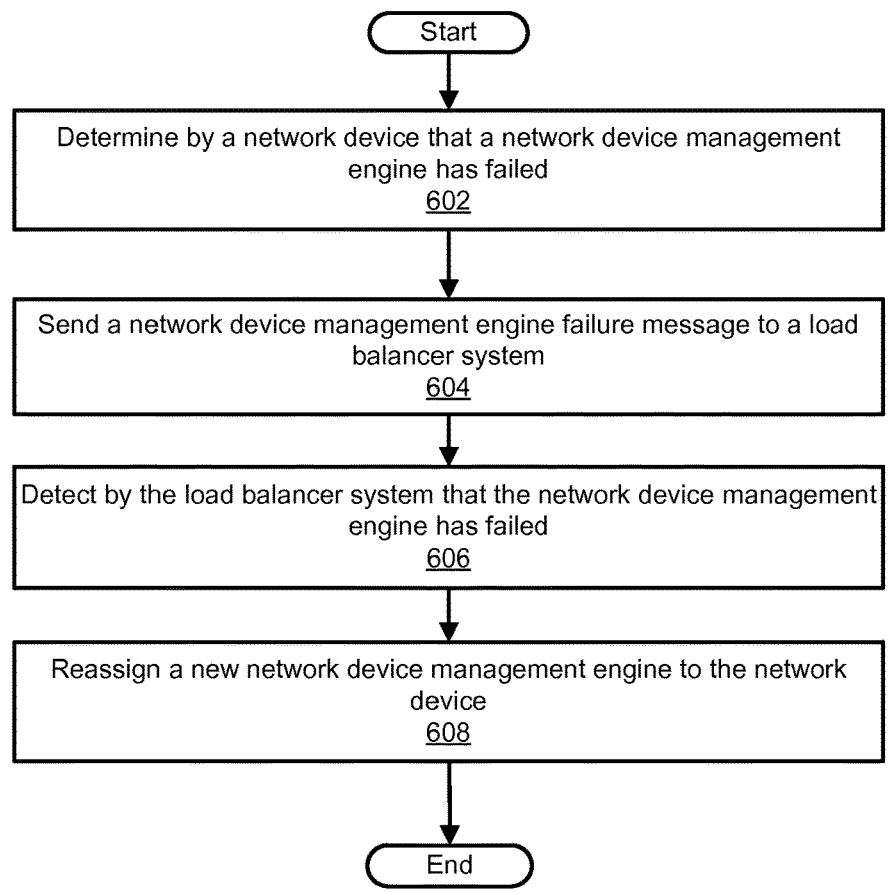
FIG. 6 depicts a flowchart of an example of a method for determining that a network device management engine has failed by a network device managed by the network device management engine.

FIG. 6 depicts a flowchart 600 of an example of a method for determining that a network device management engine has failed by a network device managed by the network device management engine. The flowchart begins at module 602, with determining that a network device management engine has failed by a network device that is managed by the network device management engine. In one example, the network device determines that the network device management engine has failed when the network device stops receiving traffic from the network device management engine.

The flowchart continues to module 604 where a network device management engine failure message is sent form the network device to a load balancer system. In one example, the network device generates and sends the network device management engine failure message to the load balancer system after determining that the network device management engine has failed. In another example, the network device management engine failure message identifies the network device management engine that has failed.

The flowchart continues to module 606 where the load balancer system detects that the network device management engine has failed. In one example, the load balancer system detects that the network device management engine has failed after receiving the network device management engine failure message sent from the network device at module 604. In another example, the load balancer system determines the identification of the failed network device management engine from the network device management engine failure message sent by the network device.

The flowchart continues to module 608 where the load balancer reassigns a new network device management engine to the network device. In one example, the new network device management engine is in the same region or subregion as the network device. In another example, the new network device management engine manages other network devices in the same region or subregion as the network device to which the network device management engine is being assigned.

While preferred implementations of the present inventive apparatus and method have been described, it is to be understood that the implementations described are illustrative only and that the scope of the implementations of the present inventive apparatus and method is to be defined solely by the appended claims when accorded a full range of equivalence, many variations and modifications naturally occurring to those of skill in the art from a perusal thereof.

What is claimed is:

1. A method for building and maintaining a network, the method comprising:
    operationally connecting an access point in a region that is connectable to one or more client devices in the region to an interregional redirector engine associated with a plurality of regions including the region;
    receiving at the interregional redirector engine network device information of the access point, the network device information including geography information of the region and enterprise network information of the access point;
    determining, by the interregional redirector engine, based on the network device information, a load balancer system uniquely associated with the region selectively from a plurality of load balancer systems that are uniquely associated with different regions and coupled to the interregional redirector engine associated with the plurality of regions;
    assigning, by the interregional redirector engine, the access point to the load balancer system;
    assigning, by the load balancer system, the access point to a regional network device management engine associated with the region based on the network device information, the regional network device management engine being determined selectively from a plurality of regional network device management engines that are associated with the region and coupled to different sets of one or more access points;
    managing, by the load balancer system, a failure of the regional network device management engine in communication with the access point based on network device management engine failure information provided from the access point to the load balancer system without passing through the failed regional network device management engine;
    managing, by the regional network device management engine, the access point in providing access to an enterprise network.

2. The method of claim 1, further comprising validating the access point.

3. The method of claim 1, further comprising:
    receiving, by the load balancer system, network device management engine status information from the network device management engine, which is a first network device management engine of the plurality of network device management engines, and a second network device management engine of the plurality of network device management engines;
    reassigning, by the load balancer system, the access point to the second network device management engine based on the network device management engine status information from the first and second network device management engines.

4. The method of claim 1, further comprising:
    receiving, by the load balancer system, network device management engine status information from the network device management engine, which is a first network device management engine of the plurality of network device management engines;
    determining the first network device management engine has failed based on the network device management engine status information;
    reassigning, by the load balancer system, the access point to a second network device management engine of the plurality of network device management engines.

5. The method of claim 4, further comprising assigning, by the load balancer system, a second access point to the second network device management engine.

6. The method of claim 4, further comprising sending, from the load balancer system, a network device management engine status notification to an administration engine, the network device management engine status notification indicating a reason why the first network device management engine was determined as failed.

7. A system for building and maintaining a network, the system comprising:
    a plurality of access points provided in a region and configured to provide access to an enterprise network to one or more client devices in the region;
    a plurality of load balancer systems uniquely associated with different regions;
    a plurality of regional network device management engines associated with the region and coupled to different sets of one or more of the access points;
    an interregional redirector engine associated with a plurality of regions including the region, coupled to the plurality of load balancer systems and the access points, and configured to:
        receive network device information from one of the access points, the network device information including geography information of the region and enterprise network information of said one of the access points;
        determine, based on the network device information, a load balancer system uniquely associated with the region selectively from the plurality of load balancer systems;
        assign said one of the access points to the load balancer system;
    the load balancer system configured to assign said one of the access points to a regional network device management engine determined selectively from the plurality of regional network device management engines based on the network device information and manage a failure of the regional network device management engine in communication with said one of the access points based on network device management engine failure information provided from said one of the access points to the load balancer system without passing through the failed regional network device management engine, the regional network device management engine configured to manage the access points in providing access to the enterprise network.

8. The system of claim 7, wherein the interregional redirector engine is further configured to validate said one of the access points.

9. The system of claim 7, wherein the load balancer system is configured to:
    receive network device management engine status information from the network device management engine, which is a first network device management engine of the plurality of network device management engines, and a second network device management engine of the plurality of network device management engines;
reassign said one of the access points to the second network device management engine based on the network device management engine status information from the first and second network device management engines.

10. The method of claim 7, wherein the load balancer system is configured to:
receive network device management engine status information from the network device management engine, which is a first network device management engine of the plurality of network device management engines;
determine that the first network device management engine has failed;
reassign the access point to a second network device management engine of the plurality of network device management engines.

11. The system of claim 10, wherein the load balancer system is further configured to assign a second access point of the plurality of access points to the second network device management engine.

12. The system of claim 10, wherein the load balancer system is further configured to send a network device management engine status notification to an administration engine, the network device management engine status notification indicating a reason why the first network device management engine was determined as failed.

13. The method of claim 1, further comprising:
receiving, by the load balancer system, network device management engine status information from the network device management engine, which is a first network device management engine of the plurality of network device management engines, and a second network device management engine of the plurality of network device management engines;
reassigning, by the load balancer system, a first portion of a plurality of access points assigned to the first network device management engine, including the access point, to the second network device management engine without reassigning a second portion of the plurality of access points assigned to the first network device management engine, based on the network device management engine status information received from the first and second network device management engines.

14. The method of claim 1, further comprising:
receiving, by a network device management engine message queue uniquely associated with the region, network device management engine status information from the network device management engine, which is a first network device management engine of the plurality of network device management engines, and a second network device management engine of the plurality of network device management engines;
retrieving, by the load balancer system, the network device management engine status information received from the first and second network device management engines from the network device management engine message queue;
reassigning, by the load balancer system, a first portion of a plurality of access points assigned to the first network device management engine, including the access point, to the second network device management engine without reassigning a second portion of the plurality of access points assigned to the first network device management engine, based on the network device management engine status information retrieved from the network device management engine message queue.

15. The method of claim 1, further comprising:
receiving, by the load balancer system, the network device management engine failure information from the access point coupled to the failed network device management engine, which is a first network device management engine of the plurality of network device management engines;
reassigning, by the load balancer system, the access point to a second network device management engine of the plurality of network device management engines, based on the network device management engine failure information from the access point.

16. The system of claim 7, wherein the load balancer system is further configured to:
receive network device management engine status information from the network device management engine, which is a first network device management engine of the plurality of network device management engines, and a second network device management engine of the plurality of network device management engines;
reassign a first portion of the plurality of access points assigned to the first network device management engine, including said one of the access points, to the second network device management engine without reassigning a second portion of the plurality of access points assigned to the first network device management engine, based on the network device management engine status information received from the first and second network device management engines.

17. The system of claim 7, further comprising:
a network device management engine message queue uniquely associated with the region and configured to receive network device management engine status information from the network device management engine, which is a first network device management engine of the plurality of network device management engines, and a second network device management engine of the plurality of network device management engines,
wherein the load balancer system is further configured to:
retrieve the network device management engine status information received from the first and second network device management engines from the network device management engine message queue;
reassign a first portion of a plurality of access points assigned to the first network device management engine, including said one of the access points, to the second network device management engine without reassigning a second portion of the plurality of access points assigned to the first network device management engine, based on the network device management engine status information retrieved from the network device management engine message queue.

18. The system of claim 7, wherein the load balancer system is further configured to:
receive the network device management engine failure information from said one of the access points coupled to the failed network device management engine, which is a first network device management engine of the plurality of network device management engines;
reassign said one of the access points to a second network device management engine of the plurality of network device management engines, based on the network device management engine failure information from said one of the access points.

\* \* \* \* \*